Nov. 21, 1961   E. W. LENZ   3,009,186
WINDSHIELD CLEANER
Filed Aug. 17, 1959
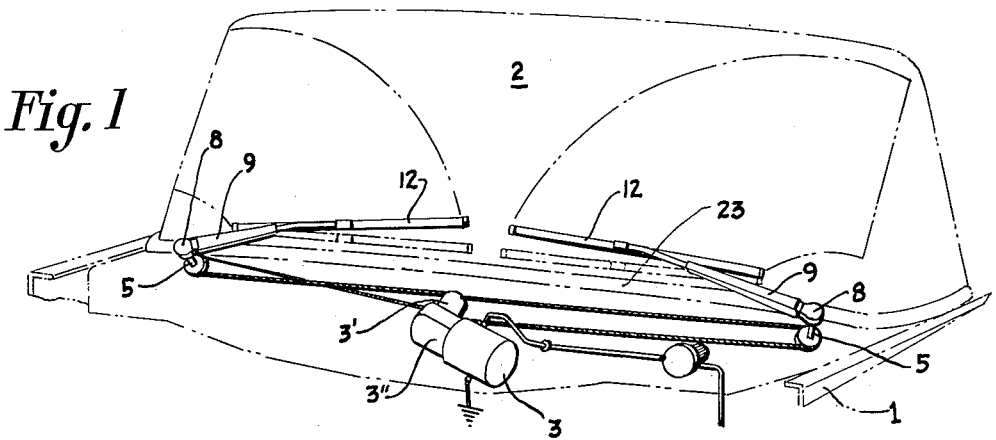
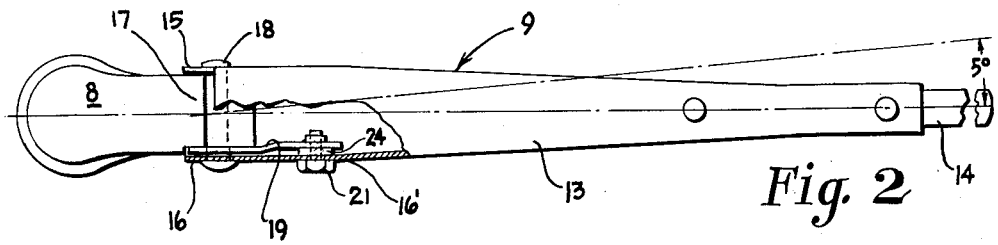
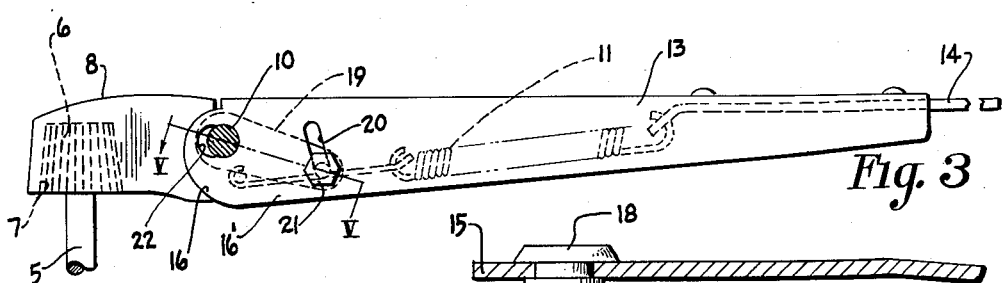
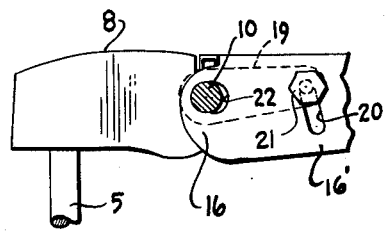
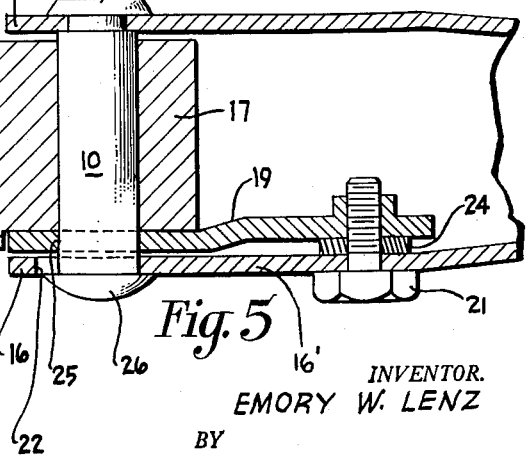
INVENTOR.
EMORY W. LENZ
BY
Bean Brooks Buckley & Bean
ATTORNEYS 3,009,186
WINDSHIELD CLEANER
Emery W. Lenz, Buffalo, N.Y., assignor to Trico
Products Corporation, Buffalo, N.Y.
Filed Aug. 17, 1959, Ser. No. 834,259
8 Claims. (Cl. 15—250.35)

This invention relates to a windshield wiper arm structure designed to provide a secondary adjustment to accomplish a more finely calibrated degree of arm positioning on a driven wiper arm shaft.

Generally heretofore use has been made of a serrated arm head drive burr, more completely described in Patent No. 2,286,035. The size of the driving member has, for practical manufacturing expediency, confined the serrations to seventy-two which permits an adjustment to within the distance between the flutes of 5 degrees.

To add to the fineness of positioning from the standpoint of parking of the wiper blades when the wiper is arrested, the instant invention in the illustrated embodiment includes a concealed internal adjusting lever, which is arranged to carry one end of the arm hinge pin, the pin being confined to a fixed location in the arm head and one side of the spring retainer section to which the blade is attached.

A primary object of the invention is to provide a means of individually setting the angular relation of the hinge pin in individual arm installations—after the arm has been positioned on the drive burr to within the limit of adjustable degree by means of the fluted serrations. This objective is accomplished by first positioning the arm to within a close park with the windshield lower molding as permitted by the flutes. Thereafter the second or refined adjustment of the arm position is achieved by loosening a set or locking screw member which controls the position of an adjusting lever, through which the arm's hinge pin is located in relation to one side of the spring retainer portion of the arm front. The lever is shifted in the plane of the hinge pin, the hinge pin being rotatably anchored to the arm head in a fixed relation thereto and extending transversely thereof. The rotational relation between the hinge pin and the arm head remains constant under all conditions of operation, but one straddling side wall of the spring retainer channel is permitted to move in relation to the pin through the provision of a slotted opening in the channel. The adjusting lever is movable pivotally in like manner to that of the spring retainer channel on its inner end around the hinge pin and is made movable for adjustment in an angular relation by a locking set screw which, when loosened, permits the lever to be moved in a slot in the retainer side wall with a camming action to effect a refinement in locating the parking position. The result of operating the lever from one extremity of the slot to another will produce a canting motion in the outer arm section in relation to the arm head to within a limited degree, and beyond a given flute-determining setting. This final refinement, as a supplement to the major flute setting, is maintained by a locking device. The canting of the spring retainer, as above described, results in providing movement up to 5 degrees in the illustrated disclosure—so that the arm itself may be first set on the fluted drive burr to an approximate parking position at the molding and thereafter supplemented to further movement within the next five degree increment of movement to obtain a tight parking of the blade against the molding. This adjustment is flexible as a result of the locking device which may be in the form of a set screw in the slot in the channel wall. The locking set screw is movable angularly in the slot, lengthening or shortening the distance between the inner pivot of the adjusting lever and the outer end thereof. Due to the angle of the slot in which the locking set screw is secured, the holding of the lever is complemented by the angularity of the side slot. As the lever is moved to increase the distance between the pivot pin and the outer end of the lever, the set screw travels a greater distance than the movement of the lever in the performance of the adjustment. Due to the angle of the slot in the spring retainer, the locking set screw is supported by a pull or camming against the side of the slot, having a substantially perpendicular movement at a sharp angle to the pull of the arm loading spring action, making the attachment and adjustment fully secure.

It has been found that substantially infinite adjustment may be obtained by the combination of the adjustment flutes in the arm head and the adjustable lever, movable within the slot to lengthen or shorten the distance between the arm head pivot pin and one side of the arm front spring retainer channel. The lever may therefore be considered as a part of the one side of the channel and as such constitutes an extensible part of the outer arm section. Other suitable means may be utilized to extend the extensible part to effect the canting. The movement described has substantially the effect of an oblique pivot, the limited degree of canting of the arm front section in relation to the arm head being permitted by the freedom of movement of the opposite channel wall side section of the retainer, which is permitted to pivot and rock to the degree necessary to pull the arm into its necessary degree of angularity in relation to the head. Very little movement is required to achieve the end result of 5 degrees of end adjustment.

Another object of the invention is to provide an adjustment of the relationship of the wiper carrying arm to the drive shaft, which adjustment can be made after the initial placement of the arm and supplemental to such original positioning of the arm. Without the necessity of removing the arm from its mounting on the drive shaft, a refinement to the major adjustment may be accomplished.

The foregoing and other objects will manifest themselves as this description progresses, reference being had to the accompanying drawing, wherein FIG. 1 is a fragmentary perspective view of a motor vehicle equipped with wiper arms embodying the present invention;

FIG. 2 is a front elevation of one of the arms with parts broken away to more clearly disclose the invention;

FIG. 3 is a fragmentary side elevation of the improved wiper arm in a normal adjustment;

FIG. 4 is a similar view showing the wiper arm in its canted adjustment; and

FIG. 5 is an enlarged horizontal section about on line 5—5 of FIG. 3.

Referring more particularly to the drawing, the numeral 1 designates a motor vehicle having a windshield 2 with an eectric windshield cleaner motor 3 mounted to the lower side thereof and having its drive shaft 3' from a speed reducing transmission 3" operatively connected through a suitable transmission 4 to wiper shafts 5 at opposite sides of the vehicle, each shaft having a fluted head or driving burr 6 fitting within a fluted socket 7 in its arm in a well-known manner and as shown in the aforesaid patent. The number of flutes may be predetermined to detachably mount the wiper arm on the shaft for bringing the wiper to a definite parking position. With the well-known pneumatic motor the wiper is readily parked in a definite position without difficulty, but with an electric motor there is a problem by reason of the intricate transmission gearing. Where the flutes are approximately five degrees apart and the wiper arrest a distance above the lower molding it remains there to the annoyance of the motorist and consequently the accurate installation to remedy this improper parking is ever present when the electric windshield cleaner is installed.

According to the present invention the major adjustment of the parking placement effected through the fluting is supplemented by a refining adjustment of which one embodiment is shown in the drawing. In this embodiment the wiper arm has an inner or mounting section 8 in the underside of which is formed the socket 7 for receiving the fluted head 6, and an outer section 9 joined to the inner section by a hinge pin 10. These two sections are acted upon by a spring 11 for urging the wiper 12 on the outer end of the arm into wiping contact with the glass. The outer section has a channel portion 13 and a wiper carrying rod 14 extending therefrom, the channel forming a retaining chamber for the spring 11.

The spring retaining channel 13 has the inner ends of its side walls forming ears or knuckles 15 and 16 which straddle a knuckle part 17 on the outer end of the mounting section 8, said knuckle 17 being formed with a journal bearing to provide journal support for the hinge pin 10. One end of the hinge pin pierces the ear or knuckle 15 and is swaged over the outer surface thereof, as indicated at 18, in a fixed manner. Fixedly mounted on the opposite end of the hinge pin is a lever or crank part 19 and this lever extends along the side wall 16', which wall is formed with a cam slot 20 in which operates the shank of a screw or bolt 21 carried by the inner end of the lever 19.

By loosening the bolt 21 from its clamping contact with the outer surface of the walls 16', the bolt may be moved up the inclined slot 20 to exert an outward camming push upon the adjacent side wall of the slot. This exerted force tends to displace or cant the wiper-carrying outer end of the arm about an axis adjacent the upset head 18 as permitted by the inherent resiliency in the ear or knuckle 15. This action of the lever 19 has the effect of moving the side wall 16' outwardly lengthwise of the arm, and to permit this such wall is provided with a slot 22 for riding contact on the hinge pin. The lever 19 actually constitutes an extensible knuckle on the side wall 16', and the bolt 21, by riding up the inclined wall of the cam slot 20 against the urge of spring 11, serves to exert an outward canting force on the outer section to shift the wiper with a refined adjustment to the desired parking position, bringing it down against the windshield molding 23. When the refined adjustment has been made, the canting means 21 is fixed within the cam slot by tightening the screw upon a lock washer 24 between the side walls 16' and the lever 19.

The lever may be suitably mounted on the hinge pin, as indicated at 25, at a point preferably spaced from the pin head 26. This location provides ample clearance for the sliding movement of the ear 16 between the overhanging flange of the head 26 and the lever 19, as shown more clearly in the enlarged view of FIG. 5.

When making an arm installation, the fluted socket 7 is inverted over the fluted driving burr 6 to a selected position in which the wiper 12 will be brought down toward the molding as far as the intermeshing flutes will permit, such as is shown in full lines in FIG. 1. Thereafter the canting means 21 will be loosened and moved within the cam slot 20 to cant the wiper into closer proximity to molding, as suggested by the doted lines in FIG. 1. Then, the bolt 21 will be secured to fix the refined position so that in the future whenever the wiper is arrested it will park in the desired position.

The foregoing description has been given in detail without thought of limitation since the inventive principles involved are capable of assuming other physical embodiments without departing from the spirit of the invention and the scope of the appended claims.

What is claimed is:

1. A windshield wiper arm comprising an inner shaft-mounted section having a journal bearing, a hinge pin journaled in the bearing, an outer wiper-carrying section having a pair of bearing-straddling parts, spring means operatively connecting the sections to apply wiping pressure to the wiper, one straddling part being fixed to one end of the hinge pin and the companion straddling part being slidably supported on the opposite end of the hinge pin, a lever fixed to said opposite end of the hinge pin and camming against said companion straddling part to cant the outer end of the arm about an axis adjacent the first end of the hinge pin for locating a wiper parking position with respect to an associated windshield frame.

2. A windshield wiper arm comprising an inner shaft-mounted section having a journal bearing, a hinge pin journaled in the bearing, an outer wiper-carrying section having a pair of bearing-straddling parts, spring means operatively connecting the sections to apply wiping pressure to the wiper, one part being yieldable and riveted to one end of the hinge pin as a center about which the wiper may be displaced to a park-determining position, the companion part having an extensible portion fixed to the opposite end of the hinge pin, and canting means operable to extend said portion lengthwise of the arm to so displace the wiper end of the arm about the yieldable part.

3. A windshield wiper arm having an inner section with a fluted socket for mounting on a fluted head of a drive shaft to enable an initial major parking placement of the arm on the shaft as determined by the flute provided increments of adjustment, said arm having an outer wiper-carrying section hinged to the inner section by a knuckle joint having a pair of knuckles on one section straddling a single knuckle on the other section, the three knuckles being joined by a hinged pin, one knuckle of the pair being adjustable lengthwise of the arm to cant the outer end of the wiper carrying section about an axis adjacent the other knuckle of said pair, and canting means operable to so adjust said adjustable knuckle to give a refined parking placement of the wiper supplemental to the major placement.

4. A windshield wiper arm comprising an inner shaft-mountable section and an outer wiper-supporting section, one of said sections having a journal bearing and the other section having spaced ears straddling the bearing, a hinge pin journaled in the bearing and fixedly attached to one straddling ear, the other straddling ear being slidably supported on the opposite end of the pin in a direction lengthwise of the arm for canting adjustment sidewise of the outer end of the arm about the fixedly attached straddling ear, and canting means for imparting such sidewise adjustment for locating the parking position for an associated wiper.

5. A windshield wiper arm having an inner shaft-mountable section and an outer wiper-supporting section, one section having a transverse pin-receiving opening and the other section having spaced ears straddling the pin receiving opening, a hinge pin mounted in the pin receiving opening, one ear being supported by one end of the hinge pin for hinging movement of the outer section about the pin axis and the companion ear having a slot extending lengthwise of the arm and slidable upon the opposite end of the hinge pin for permitting the outer end of the arm to be canted sideways about the first end of the hinge pin, canting means operable to exert a canting force on the companion ear, and a spring cooperating with the two sections for applying a wiping pressure upon a supported wiper.

6. A windshield wiper arm according to claim 5, wherein said canting means includes a crank part fixed on said opposite end portion of the hinge pin and gives support to said other straddling ear for hinging action.

7. A windshield wiper arm comprising an inner shaft-mountable section and an outer wiper-supporting section, one section having spaced ears straddling a portion of the other section, one ear pivoted by a pin on said portion at one side thereof and the other ear having pivotal movement coaxial with the pin but at the opposite side of said portion, and canting means operable to adjust said other ear in a direction lengthwise of the arm to cant the outer end of the wiper supporting section sideways for determining the parking position of its wiper with respect to the molding of an associated windshield.

8. A windshield wiper arm comprising an inner shaft-mountable section and an outer wiper-carrying section, one section having spaced ears straddling a portion of the other section, one ear having pivotal support on said portion at one side thereof and the other ear having riding support on the opposite side of said portion lengthwise of the arm and also pivotal support substantially coaxial with respect to said one ear, and means adjustably fixing said other ear for pivoting about an axis within the extent of its riding support thereby to cant the outer end of the wiper-carrying section sidewise for determining the parking position for the carried wiper relative to the molding of an associated windshield.

References Cited in the file of this patent
UNITED STATES PATENTS

| 50,880 | Osborne | Nov. 7, 1865 |
| 2,715,238 | Krohm | Aug. 16, 1955 |